US008495231B1

(12) United States Patent
Katapadi et al.

(10) Patent No.: US 8,495,231 B1
(45) Date of Patent: Jul. 23, 2013

(54) SYSTEM AND METHOD FOR REMOTE CALL CONTROL

(75) Inventors: Umesh P. Katapadi, Raleigh, NC (US); Daniel P. Linton, Apex, NC (US); David W. Mills, Raleigh, NC (US); Loganathan D. Modahala, Cary, NC (US); Eddie B. Soliman, San Jose, NC (US)

(73) Assignee: Cisco Technology, Inc., San Jose, CA (US)

( * ) Notice: Subject to any disclaimer, the term of this patent is extended or adjusted under 35 U.S.C. 154(b) by 1283 days.

(21) Appl. No.: 11/383,601

(22) Filed: May 16, 2006

(51) Int. Cl.
G06F 15/16 (2006.01)
H04M 3/42 (2006.01)

(52) U.S. Cl.
USPC ...................................... 709/230; 379/201.01

(58) Field of Classification Search
USPC .................................................. 709/206, 230
See application file for complete search history.

(56) References Cited

U.S. PATENT DOCUMENTS

| | | | |
|---|---|---|---|
| 3,963,874 A | 6/1976 | Pommerening et al. | 179/18 AB |
| 4,809,321 A | 2/1989 | Morganstein et al. | 379/211 |
| 6,157,707 A * | 12/2000 | Baulier et al. | 379/189 |
| 6,501,750 B1 | 12/2002 | Shaffer et al. | 370/352 |
| 6,510,162 B1 | 1/2003 | Fijolek et al. | 370/432 |
| 6,546,087 B2 | 4/2003 | Shaffer et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 2004/0202303 A1 * | 10/2004 | Costa-Requena et al. | 379/205.01 |

(Continued)

OTHER PUBLICATIONS

R. Mahy, et al., "The Session Initiation Protocol (SIP) 'Join' Header," The Internet Society, RFC 3991, http://www.ietf.org/rfc/rfc3911.txt, 15 pages, Oct. 2004.

(Continued)

*Primary Examiner* — David Lazaro
*Assistant Examiner* — Xiang Yu
(74) *Attorney, Agent, or Firm* — Baker Botts L.L.P.

(57) ABSTRACT

A remote call control method is provided, the method comprising exchanging a session initiation protocol message, wherein the message indicates a call control request is associated with the message; identifying a resource associated with the call control request, wherein the resource includes one or more parameters of the call control request; and performing a call control operation according to the parameters of the call control request.

A communication platform and endpoint are provided for executing a call control operation according to a call control request. The communication platform and endpoint comprise a processor component operable to exchange a session initiation protocol message, identify a resource associated with the call control request, and execute a call control operation according to the parameters of the call control request. The message indicates a call control request is associated with the message, and the resource includes parameters associated with the call control request.

36 Claims, 14 Drawing Sheets

U.S. PATENT DOCUMENTS

2005/0108347 A1* 5/2005 Lybeck et al. ............... 709/207
2006/0007954 A1 1/2006 Agrawal et al. ............... 370/466
2006/0242242 A1* 10/2006 Ezumi et al. .................. 709/206

OTHER PUBLICATIONS

R. Mahy, et al., "The Session Initiation Protocol (SIP) 'Replaces' Header," The Internet Society, RFC 3891, http://www.ietf.org/rfc/rfc3891.txt, 15 pages, Sep. 2004.

M. Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pages, Jun. 15, 2006.

J. Rosenberg et al., "An INVITE Initiated Dialog Event Package for the Session Initiation Protocol (SIP)," RFC 4235, http://ietfreport.isoc.org/idref/draft-ietf-sipping-dialog-package-06.txt, 38 pages, Apr. 12, 2005.

R. Mahy et al., "Remote Call Control in SIP using the REFER method and the session-oriented dialog package," Internet Draft (no longer posted on Internet), The Internet Society, Feb. 2004, 35 pages.

R. Mahy et al., "Remote Call Control in Session Initiation Protocol (SIP) using the REFER Method and the session-oriented dialog package," Internet Draft, http://www.ietf.org/internet-drafts/draft-mahy-sip-remote-cc-03.txt, The Internet Society, Mar. 5, 2006, 14 pages.

H. Schulzrinne et al., "RTP Payload for DTMF Digits, Telephony Tones and Telephony Signals," The Internet Society, http://tools.ietf.org/html/rfc2833, May 2000, 29 pages.

A. B. Roach, "Session Initiation Protocol (SIP)-Specific Event Notification," The Internet Society, http://www.ietf.org/rfc/rfc3265.txt, Jun. 2002, 36 pages.

J. Rosenberg et al., "An Offer/Answer Model with the Session Description Protocol (SDP)," The Internet Society, http://www.ietf.org/rfc/rfc3264.txt, Jun. 2002, 24 pages.

J. Rosenberg et al., "Caller Preferences for the Session Initiation Protocol (SIP)," The Internet Society, http://www.ietf.org/rfc/rfc3841.txt, Aug. 2004, 25 pages.

H. Schulzrinne, "Session Initiation Protocol (SIP)-H.323 Interworking Requirements," The Internet Society, http://www.ietf.org/rfc/rfc4123.txt, Jul. 2005, 15 pages.

J. Rosenberg et al., "SIP: Session Initiation Protocol," Standards Track, The Internet Society, Jun. 2002, 252 pages.

* cited by examiner

FIG. 2

```
REFER sip:1005@172.18.201.175:52796 SIP/2.0
Via: SIP/2.0/TCP 172.18.195.38;branch=z9hG4bK2700c7a8
From: <sip:1005@172.18.195.38>;tag=1811797983
To: <sip:1005@172.18.201.175>
Call-ID: 7a1c1a80-3c414292-2ee-26c312ac@172.18.195.38
CSeq: 101 REFER
Max-Forwards: 70
Contact: <sip:1005@172.18.195.38:5060;transport=tcp>
User-Agent: Cisco-CCM5.0
Require: norefersub
Expires: 0
Refer-To: cid:1234567890:172.18.195.38
Content-Id: <1234567890@172.18.195.38>
Content-Type: application/x-cisco-remotecc-request+xml
Referred-By: <sip:1005@172.18.195.38>
Content-Length: 117

<x-cisco-remotecc-request>
   <privacyreq>
     <status>true</status>
   </privacyreq>
</x-cisco-remotecc-request>
```

FIG. 3

| REMOTECC REQUEST | FEATURE | SUBSCRIPTION OR TRANSACTION | NOTES |
|---|---|---|---|
| softkeyeventmsg | conference | SUBSCRIPTION | THE REQUIRE HEADER SHOULD NOT CONTAIN A norefersub TAG. B2BUA GENERATES NOTIFY RESPONSES WHILE THE CONFERENCE IS BEING ESTABLISHED |
| softkeyeventmsg | park | TRANSACTION | B2BUA EXPECTS norefersub TO BE INCLUDED IN THE REQUIRE HEADER |
| softkeyeventmsg | conflist | TRANSACTION | B2BUA EXPECTS norefersub TO BE INCLUDED IN THE REQUIRE HEADER. NOTE THAT THIS SOFTKEY TRIGGERS OTHER remotecc REQUESTS WHICH HAVE THEIR OWN CHARACTERISTICS (e.g. datapassthroughreq) |
| softkeyeventmsg | rmlastconf | TRANSACTION | B2BUA EXPECTS norefersub TO BE INCLUDED IN THE REQUIRE HEADER. NOTE THAT THIS SOFTKEY TRIGGERS OTHER remotecc REQUESTS WHICH HAVE THEIR OWN CHARACTERISTICS (e.g. datapassthroughreq) |
| softkeyeventmsg | idivert | TRANSACTION | B2BUA EXPECTS norefersub TO BE INCLUDED IN THE REQUIRE HEADER |
| softkeyeventmsg | callback | TRANSACTION | B2BUA EXPECTS norefersub TO BE INCLUDED IN THE REQUIRE HEADER. NOTE THAT THIS SOFTKEY TRIGGERS OTHER remotecc REQUESTS WHICH HAVE THEIR OWN CHARACTERISTICS (e.g. datapassthroughreq) |
| softkeyeventmsg | qrt | TRANSACTION | B2BUA EXPECTS norefersub TO BE INCLUDED IN THE REQUIRE HEADER. NOTE THAT THIS SOFTKEY TRIGGERS OTHER remotecc REQUESTS WHICH HAVE THEIR OWN CHARACTERISTICS (e.g. datapassthroughreq) |
| softkeyeventmsg | select | TRANSACTION | B2BUA EXPECTS norefersub TO BE INCLUDED IN THE REQUIRE HEADER |
| softkeyeventmsg | unselect | TRANSACTION | B2BUA EXPECTS norefersub TO BE INCLUDED IN THE REQUIRE HEADER |
| linekeyeventmsg | privacy | TRANSACTION | B2BUA EXPECTS norefersub TO BE INCLUDED IN THE REQUIRE HEADER. NOTE THAT THIS LINE KEY EVENT TRIGGERS OTHER remotecc REQUESTS WHICH HAVE THEIR OWN CHARACTERISTICS (e.g. privacyreq) |
| datapassthroughreq | N/A | SUBSCRIPTION \| TRANSACTION | THE REQUIRE HEADER IN THE REFER MAY OR MAY NOT CONTAIN A norefersub TAG DEPENDING ON THE SCENARIO. REFER TO CALL FLOW EXAMPLES FOR MORE INFORMATION. B2BUA WILL GENERATE remotecc NOTIFY RESPONSES WITH MULTIPART MINE CONTENT BODIES |

*FIG. 4*

| ELEMENT | PARENT ELEMENT | NOTES |
|---|---|---|
| softkeyeventmsg | x-cisco-remotecc-request | USED TO SEND CERTAIN SOFTKEY PRESSES TO B2BUA |
| softkeyevent | softkeyeventmsg | EXAMPLES:<br>• conference<br>• park<br>• conflist<br>• rmlastconf<br>• idivert<br>• callback<br>• qrt<br>• select<br>• unselect |
| dialogid | softkeyeventmsg | SPECIFIES DIALOG ID OF AFFECTED CALL. FOR CONFERENCE, THIS IS THE DIALOG ID OF THE PRIMARY CALL (WHICH WILL REMAIN IN TACT ONCE THE CONFERENCE IS ESTABLISHED). IF THE DIALOG ID SUB ELEMENTS ARE EMPTY, THE REQUEST IS A NON CALL REQUEST (e.g. CallBack AND Qrt MAKE USE OF NON CALL REQUESTS) |
| callid | dialogid | THESE ELEMENTS CONSTITUTE THE DIALOG ID. SEE dialogid |
| localtag | dialogid | |
| remotetag | dialogid | |
| linenumber | softkeyeventmsg | OPTIONAL. SPECIFIES THE LINE BUTTON ASSOCIATED WITH THE LINE ON THE PHONE. FOR EXAMPLE, LINE NUMBER ONE FOR THE FIRST LINE BUTTON |
| participantnum | softkeyeventmsg | |
| consultdialogid | softkeyeventmsg | SPECIFIES THE DIALOG ID OF THE CONSULTATIVE CALL LEG IF APPLICABLE. MAY ONLY APPLY TO CONFERENCE REQUESTS |
| callid | consultdialogid | THESE ELEMENTS CONSTITUTE THE CONSULTATIVE DIALOG ID. SEE consultdialogid NOTES |
| localtag | consultdialogid | |
| remotetag | consultdialogid | |
| state | softkeyeventmsg | |
| joindialogid | softkeyeventmsg | |
| callid | joindialogid | THESE ELEMENTS CONSTITUTE THE CONSULTATIVE DIALOG ID. SEE joindialogid NOTES |
| localtag | joindialogid | |
| remotetag | joindialogid | |
| userdata | softkeyeventmsg | |

FIG. 5

| ELEMENT | PARENT ELEMENT | NOTES |
|---|---|---|
| linekeyeventmsg | x-cisco-remotecc-request | USED TO SEND A LINE KEY PRESS TO B2BUA |
| linekeyevent | linekeyeventmsg | EXAMPLE:<br>• privacy |
| status | linekeyeventmsg | • on<br>• off<br>A VALUE OF on ENABLES SHARED LINE PRIVACY FOR ALL CALLS ACTIVE AT THE DEVICE. THE VALUE, off, DISABLES SHARED LINE PRIVACY FOR ALL CALLS ACTIVE AT THE DEVICE. IF THIS ELEMENT IS NOT SPECIFIED IN THE REQUEST, off IS ASSUMED |
| dialogid | linekeyeventmsg | SPECIFIES THE DIALOG ID OF THE AFFECTED CALL. THE PRIVACY SETTING MAY BE DEVICE BASED, AND THIS MAY NOT APPLY |
| callid | dialogid | THESE ELEMENTS CONSTITUTE THE DIALOG ID. SEE dialogid NOTES |
| localtag | dialogid | |
| remotetag | dialogid | |
| linekeynumber | linekeyeventmsg | |

FIG. 6

| ELEMENT | PARENT ELEMENT | NOTES |
|---|---|---|
| datapassthroughreq | x-cisco-remotecc-request | SEND XSI XML KEY PRESSES TO B2BUA FEATURES AND TELEPHONY APPLICATIONS |
| applicationid | datapassthroughreq | ALL SUB ELEMENT VALUES ARE PASSED THROUGH TO THE FEATURE OR TELEPHONY APPLICATION |
| transactionid | datapassthroughreq | |
| stationsequence | datapassthroughreq | |
| displaypriority | datapassthroughreq | |
| appinstance | datapassthroughreq | |
| routingid | datapassthroughreq | |
| confid | datapassthroughreq | |

FIG. 7

| REMOTECC REQUEST | FUNCTION | SUBSCRIPTION OR TRANSACTION | NOTES |
| --- | --- | --- | --- |
| initiatecallreq | callback AND TELEPHONY APPLICATIONS | TRANSACTION | B2BUA INCLUDES norefersub IN THE REQUIRE HEADER |
| holdretrievereq | conference AND TELEPHONY APPLICATIONS | TRANSACTION | B2BUA INCLUDES norefersub IN THE REQUIRE HEADER |
| privacyreq | PRIVACY STATUS | TRANSACTION | B2BUA INCLUDES norefersub IN THE REQUIRE HEADER |
| statuslineupdatereq | STATUS LINE DISPLAYS | TRANSACTION | B2BUA INCLUDES norefersub IN THE REQUIRE HEADER |
| playtonereq | TONE PLAYOUT | TRANSACTION | B2BUA INCLUDES norefersub IN THE REQUIRE HEADER |
| cfwdallupdatereq | CALL FORWARD ALL SETTINGS | TRANSACTION | B2BUA INCLUDES norefersub IN THE REQUIRE HEADER |
| datapassthroughreq | callback, qrt, conflist, TELEPHONY APPLICATIONS | SUBSCRIPTION | THE REQUIRE HEADER IN THE REFER DOES NOT CONTAIN A norefersub TAG. B2BUA WILL RECEIVE AND PROCESS remotecc NOTIFY RESPONSES WITH MULTIPART MINE CONTENT BODIES |
| dialcallreq | TELEPHONY APPLICATION | TRANSACTION | B2BUA INCLUDES norefersub IN THE REQUIRE HEADER |
| dialdtmfreq | TELEPHONY APPLICATIONS | TRANSACTION | B2BUA INCLUDES norefersub IN THE REQUIRE HEADER |
| disconnectcallreq | TELEPHONY APPLICATION | TRANSACTION | B2BUA INCLUDES norefersub IN THE REQUIRE HEADER |
| answercallreq | TELEPHONY APPLICATION | TRANSACTION | B2BUA INCLUDES norefersub IN THE REQUIRE HEADER |
| transfersetupreq | TELEPHONY APPLICATION | TRANSACTION | B2BUA INCLUDES norefersub IN THE REQUIRE HEADER |
| transfercompletereq | TELEPHONY APPLICATION | TRANSACTION | B2BUA INCLUDES norefersub IN THE REQUIRE HEADER |
| conferencesetupreq | TELEPHONY APPLICATION | SUBSCRIPTION | B2BUA INCLUDES norefersub IN THE REQUIRE HEADER |
| holdreq | TELEPHONY APPLICATION | SUBSCRIPTION | B2BUA INCLUDES norefersub IN THE REQUIRE HEADER |
| stoptonereq | TELEPHONY APPLICATION | SUBSCRIPTION | B2BUA INCLUDES norefersub IN THE REQUIRE HEADER |
| selectreq | TELEPHONY APPLICATION | SUBSCRIPTION | B2BUA INCLUDES norefersub IN THE REQUIRE HEADER |

FIG. 8

| ELEMENT | PARENT ELEMENT | NOTES |
|---|---|---|
| initiatecallreq | x-cisco-remotecc-request | TRIGGER ENDPOINT TO SEND AN INVITE TO B2BUA. THIS INVITE MAY BE PROCEEDED BY AN OFFHOOK NOTIFY |
| dialstring | initiatecallreq | USER PART OF REQUEST-URI USED IN THE INVITE |
| linenumber | initiatecallreq | SPECIFIES THE LINE BUTTON ASSOCIATED WITH THE LINE ON THE PHONE. FOR EXAMPLE, LINE NUMBER ONE FOR THE FIRST LINE BUTTON |
| globalcallid | initiatecallreq | THE ENDPOINT SHOULD HANDLE THIS VALUE AS A GENERIC STRING. IT NEEDS TO BE SPECIFIED IN THE call:gci PARAMETER OF THE TRIGGERED OFFHOOK NOTIFY OR THE callinfo gci PARAMETER OF THE INVITE IF NO OFFHOOK NOTIFY IS SENT |

FIG. 9

| ELEMENT | PARENT ELEMENT | NOTES |
|---|---|---|
| holdretrievereq | x-cisco-remotecc-request | USED TO RESUME A HELD DIALOG |
| dialogid | holdretrievereq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |

FIG. 10

| ELEMENT | PARENT ELEMENT | NOTES |
|---|---|---|
| privacyreq | x-cisco-remotecc-request | USED TO SEND SHARED LINE PRIVACY SETTING TO THE ENDPOINT |
| status | privacyreq | SPECIFIES THE CURRENT SETTING. TRUE INDICATES THAT PRIVACY IS ENABLED. FALSE INDICATES THAT PRIVACY IS DISABLED |

FIG. 11

| ELEMENT | PARENT ELEMENT | NOTES |
|---|---|---|
| statuslineupdatereq | x-cisco-remotecc-request | USED TO DISPLAY A STATUS MESSAGE ON A PHONE USER INTERFACE |
| action | statuslineupdatereq | SUPPORT VALUE notify_display WHICH INDICATES THAT THE statustext SHOULD BE LOCALIZED AND DISPLAYED TO THE USER |
| dialogid | statuslineupdatereq | SPECIFIES THE DIALOG ID OF THE AFFECTED INVITE DIALOG. IF THE dialogid IS NOT SPECIFIED OR IF THE SUB ELEMENTS ARE EMPTY, THE TEXT IS NOT ASSOCIATED WITH ANY PARTICULAR INVITE DIALOG. IN THAT CASE, IT IS A NON CALL RELATED STATUS LINE UPDATE |
| callid | dialogid | THESE ELEMENTS CONSTITUTE THE DIALOG ID. SEE dialogid NOTES |
| localtag | dialogid | |
| remotetag | dialogid | |
| statustext | statuslineupdatereq | THE TEXT TO BE DISPLAYED. IF THE ENDPOINT SUPPORTS B2BUA ESCAPE CODES USED FOR LOCALIZATION, ESCAPE CODES MAY BE PRESENT WITHIN THE TEXT |
| displaytimeout | statuslineupdatereq | NUMBER OF SECONDS THAT THE TEXT SHOULD BE DISPLAYED |
| priority | statuslineupdatereq | PRIORITY OF DISPLAYING THIS TEXT VERSUS OTHER THINGS THAT USE THE STATUS LINE |

*FIG. 12*

| ELEMENT | PARENT ELEMENT | NOTES |
|---|---|---|
| playtonereq | x-cisco-remotecc-request | USED TO PLAY A TONE AT THE DEVICE |
| dialogid | playtonereq | SPECIFIES THE DIALOG ID OF THE AFFECTED INVITE DIALOG. IF THE dialogid IS NOT SPECIFIED OR IF THE SUB ELEMENTS ARE EMPTY, THE TONE IS NOT ASSOCIATED WITH ANY PARTICULAR INVITE DIALOG. IN THAT CASE, IT IS A NON CALL RELATED TONE |
| callid | dialogid | THESE ELEMENTS CONSTITUTE THE DIALOG ID. SEE dialogid NOTES |
| localtag | dialogid | |
| remotetag | dialogid | |
| tonetype | playtonereq | THE TONE TO BE PLAYED |
| direction | playtonereq | VALUES ARE user AND all. IF NOT SPECIFIED, user SHOULD BE ASSUMED. User INDICATES THAT THE TONE SHOULD ONLY BE PLAYED TO THE USER OF THE DEVICE. All INDICATES IT SHOULD BE PLAYED OUT TO THE USER AND TOWARDS THE NETWORK |

*FIG. 13*

| ELEMENT | PARENT ELEMENT | NOTES |
|---|---|---|
| cfwdallupdate | x-cisco-remotecc-request | USED TO SEND CALL FORWARD ALL SETTINGS TO THE ENDPOINT FOR A PARTICULAR LINE |
| fwdaddress | cfwdallupdate | USER PART OF WHERE CALLS WILL BE FORWARDED. B2BUA HANDLES THE FORWARDING ON BEHALF OF THE ENDPOINT |
| tovoicemail | cfwdallupdate | SPECIFIES on OR off. On IS SPECIFIED IF CALLS ARE BEING FORWARDED TO VOICEMAIL VERSUS ANOTHER NUMBER. Off IF THEY ARE BEING FORWARDED TO A SPECIFIED fwdaddress |

FIG. 14

| ELEMENT | PARENT ELEMENT | NOTES |
|---|---|---|
| dialcallreq | x-cisco-remotecc-request | TRIGGER ENDPOINT TO DIAL DIGITS REQUIRED TO COMPLETE A CALL. THIS REQUESTED IS EXECUTED WHEN THE CALL IS IN DIALING STATE |
| linenumber | dialcallreq | SPECIFIES THE LINE BUTTON ASSOCIATED WITH THE LINE ON THE PHONE. FOR EXAMPLE, LINE NUMBER 1 FOR THE FIRST LINE BUTTON |
| dialstring | dialcallreq | DIGITS TO BE DIALED |

FIG. 15

| ELEMENT | PARENT ELEMENT | NOTES |
|---|---|---|
| dialdtmfreq | x-cisco-remotecc-request | TRIGGER ENDPOINT TO DIAL DTMF DIGITS WHEN CALL IS READY TO SEND THE DIGITS |
| dialogid | dialdtmfreq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |
| dialstring | dialdtmfreq | DIGITS TO DIAL |

FIG. 16

| ELEMENT | PARENT ELEMENT | NOTES |
|---|---|---|
| disconnectcallreq | x-cisco-remotecc-request | TRIGGER ENDPOINT DISCONNECT AN ACTIVE CALL SPECIFIED BY THE DIALOG-ID |
| dialogid | disconnectcallreq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |

FIG. 17

| ELEMENT | PARENT ELEMENT | NOTES |
|---|---|---|
| answercallreq | x-cisco-remotecc-request | TRIGGER ENDPOINT TO ANSWER A CALL SPECIFIED BY THE DIALOG-ID |
| dialogid | answercallreq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |

FIG. 18

| ELEMENT | PARENT ELEMENT | NOTES |
|---|---|---|
| transfersetupreq | x-cisco-remotecc-request | TRIGGER ENDPOINT TO SETUP A TRANSFER OF A CALL |
| dialogid | transfersetupreq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |
| dialstring | transfersetupreq | USER PART OF REQUEST-URI USED IN THE INVITE |
| globalcallid | transfersetupreq | THE ENDPOINT SHOULD HANDLE THIS VALUE AS A GENERIC STRING. IT NEEDS TO BE SPECIFIED IN THE call:gci PARAMETER OF THE TRIGGERED OFFHOOK NOTIFY OR THE callinfo gci PARAMETER OF THE INVITE IF NO OFFHOOK NOTIFY IS SENT |

FIG. 19

| ELEMENT | PARENT ELEMENT | NOTES |
|---|---|---|
| transfercompletereq | x-cisco-remotecc-request | TRIGGER ENDPOINT TO COMPLETE A TRANSFER |
| dialogid | transfercompletereq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |
| consultdialogid | transfercompletereq | SPECIFIES THE CONSULTATION CALL DIALOG ID OF THE AFFECTED INVITE DIALOG |
| callid | consultdialogid | THESE ELEMENTS CONSTITUTE THE CONSULTATION DIALOG ID. SEE dialogid NOTES |
| localtag | consultdialogid | |
| remotetag | consultdialogid | |

FIG. 20

| ELEMENT | PARENT ELEMENT | NOTES |
|---|---|---|
| conferencesetupreq | x-cisco-remotecc-request | TRIGGER ENDPOINT TO SETUP A CONFERENCE CALL |
| dialogid | conferencesetupreq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |
| dialstring | conferencesetupreq | USER PART OF REQUEST-URI USED IN THE INVITE |
| globalcallid | conferencesetupreq | THE ENDPOINT SHOULD HANDLE THIS VALUE AS A GENERIC STRING. IT NEEDS TO BE SPECIFIED IN THE call:gci PARAMETER OF THE TRIGGERED OFFHOOK NOTIFY OR THE callinfo gci PARAMETER OF THE INVITE IF NO OFFHOOK NOTIFY IS SENT |

FIG. 21

| ELEMENT | PARENT ELEMENT | NOTES |
|---|---|---|
| conferencecompletereq | x-cisco-remotecc-request | TRIGGER ENDPOINT TO COMPLETE A TRANSFER |
| dialogid | conferencecompletereq | SPECIFIES THE DIALOG ID OF THE AFFECTED INVITE DIALOG |
| callid | dialogid | THESE ELEMENTS CONSTITUTE THE DIALOG ID. SEE dialogid NOTES |
| localtag | dialogid | |
| remotetag | dialogid | |
| consultdialogid | conferencecompletereq | SPECIFIES THE CONSULTATION CALL DIALOG ID OF THE AFFECTED INVITE DIALOG |
| callid | consultdialogid | THESE ELEMENTS CONSTITUTE THE CONSULTATION DIALOG ID. SEE dialogid NOTES |
| localtag | consultdialogid | |
| remotetag | consultdialogid | |

FIG. 22

| ELEMENT | SUPPORTED | PARENT ELEMENT | NOTES |
|---|---|---|---|
| holdreq | YES | x-cisco-remotecc-request | USED TO HOLD A DIALOG |
| dialogid | YES | holdretrievereq | SPECIFIES THE DIALOG ID OF THE AFFECTED INVITE DIALOG |
| callid | YES | dialogid | THESE ELEMENTS CONSTITUTE THE DIALOG ID. SEE dialogid NOTES |
| localtag | YES | dialogid | |
| remotetag | YES | dialogid | |

FIG. 23

| ELEMENT | PARENT ELEMENT | NOTES |
|---|---|---|
| stoptonereq | x-cisco-remotecc-request | USED TO STOP A CURRENTLY PLAYING TONE AT THE DEVICE |
| dialogid | stoptonereq | SPECIFIES THE DIALOG ID OF THE AFFECTED INVITE DIALOG. IF THE dialogid IS NOT SPECIFIED OR IF THE SUB ELEMENTS ARE EMPTY, THE TONE IS NOT ASSOCIATED WITH ANY PARTICULAR INVITE DIALOG. IN THAT CASE, IT IS A NON CALL RELATED TONE |
| callid | dialogid | THESE ELEMENTS CONSTITUTE THE DIALOG ID. SEE dialogid NOTES |
| localtag | dialogid | |
| remotetag | dialogid | |
| tonetype | stoptonereq | THE TONE TO BE STOPPED |
| direction | stoptonereq | VALUES ARE user AND all. IF NOT SPECIFIED, user SHOULD BE ASSUMED. User INDICATES THAT THE TONE SHOULD ONLY BE PLAYED TO THE USER OF THE DEVICE. All INDICATES IT SHOULD BE PLAYED OUT TO THE USER AND TOWARDS THE NETWORK |

FIG. 24

| ELEMENT | PARENT ELEMENT | NOTES |
|---|---|---|
| selectreq | x-cisco-remotecc-request | USED TO HOLD SELECT OR UNSELECT A CALL |
| dialogid | selectreq | SPECIFIES THE DIALOG ID OF THE AFFECTED ACTIVE DIALOG |
| callid | dialogid | THESE ELEMENTS CONSTITUTE THE DIALOG ID. SEE dialogid NOTES |
| localtag | dialogid | |
| remotetag | dialogid | |
| STATUS | selectreq | INDICATE IF THE CALL IS TO BE SELECTED OR UNSELECTED |

SYSTEM AND METHOD FOR REMOTE CALL CONTROL

TECHNICAL FIELD OF THE INVENTION

This invention relates in general to communications, and more particularly to a system and a method for remote call control.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace.

As new communication architectures (such as the Session Initiation Protocol) become available to the consumer, new processes need to be developed in order to optimize this emerging technology. For example, current open standard telephony environments are unable to provide many advanced calling features to the consumer. In order to deliver a sustainable product that can compete with conventional architectures, telephony developers need a platform for enabling advanced calling features.

SUMMARY OF THE INVENTION

In accordance with the present invention, the disadvantages and problems associated with providing advanced calling features in an open standards telephony environment have been substantially reduced or eliminated. In particular, interoperability for remote call control and device control operations has been enabled or substantially improved.

In accordance with one embodiment of the present invention, a remote call control method is provided. In such an embodiment the method comprises exchanging a session initiation protocol message, wherein the message indicates a call control request is associated with the message; identifying a resource associated with the call control request, wherein the resource includes one or more parameters of the call control request; and performing a call control operation according to the parameters of the call control request.

In accordance with another embodiment of the present invention, a communication platform is provided for executing a call control operation according to a call control request. In such an embodiment the communication platform comprises a processor component operable to exchange a session initiation protocol message with a remote endpoint, identify a resource associated with the call control request, and execute a call control operation according to the parameters of the call control request. The message indicates a call control request is associated with the message, and the resource includes parameters associated with the call control request.

In accordance with yet another embodiment of the present invention, an endpoint is provided for executing a call control operation according to a call control request. Such an endpoint comprises a processor element operable to exchange a session initiation protocol message with a communication platform, identify a resource associated with the call control request, and execute a call control operation according to the parameters of the call control request. The message indicates a call control request is associated with the message, and the resource includes parameters associated with the call control request.

Important technical advantages of certain embodiments of the present invention include improved interoperability between communication platforms, such as back-to-back user agents, and endpoints. In particular, one advantage of certain embodiments is improved remote control over endpoint features, such as tone and display features, and scalable error coding.

Other important technical advantages of certain embodiments of the present invention include enabling or improving the operation of advanced calling features, such as privacy and call select features.

Still other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 is an example remote call control request sent from a B2BUA to an endpoint;

FIG. 3 is a chart of exemplary call control requests that may be sent from an endpoint to a B2BUA to implement certain operations of the present invention;

FIG. 4 is a chart of exemplary schema elements that represent parameters associated with a soft-key event message request;

FIG. 5 is a chart of exemplary schema elements that represent parameters associated with a line-key event message request;

FIG. 6 is a chart of exemplary schema elements that represent parameters associated with a data pass-through request;

FIG. 7 is a chart of exemplary call control requests that may be sent from a B2BUA to an endpoint to implement certain operations of the present invention;

FIG. 8 is a chart of exemplary schema elements that represent parameters associated with a request to initiate a call;

FIG. 9 is a chart of exemplary schema elements that represent parameters associated with a hold-retrieve request;

FIG. 10 is a chart of exemplary schema elements that represent parameters associated with a privacy request;

FIG. 11 is a chart of exemplary schema elements that represent parameters associated with a status line update request;

FIG. 12 is a chart of exemplary schema elements that represent parameters associated with a play tone request;

FIG. 13 is a chart of exemplary schema elements that represent parameters associated with a call-forward-all update request FIG. 14 is a chart of exemplary schema elements that represent parameters associated with a request to dial a call;

FIG. 15 is a chart of exemplary schema elements that represent parameters associated with a dial DTMF request;

FIG. 16 is a chart of exemplary schema elements that represent parameters associated with a request to disconnect an active call;

FIG. 17 is a chart of exemplary schema elements that represent parameters associated with a request to answer a call;

FIG. 18 is a chart of exemplary schema elements that represent parameters associated with a request to setup a call transfer;

FIG. 19 is a chart of exemplary schema elements that represent parameters associated with a request to complete a call transfer;

FIG. 20 is a chart of exemplary schema elements that represent parameters associated with a request to setup a conference call;

FIG. 21 is a chart of exemplary schema elements that represent parameters associated with a request to complete a conference call;

FIG. 22 is a chart of exemplary schema elements that represent parameters associated with a request to place a call on hold;

FIG. 23 is a chart of exemplary schema elements that represent parameters associated with a request to stop a currently playing tone at a device; and FIG. 24 is a chart of exemplary schema elements that represent parameters associated with a request to select or unselect a call.

DETAILED DESCRIPTION OF THE INVENTION

Figure 1:
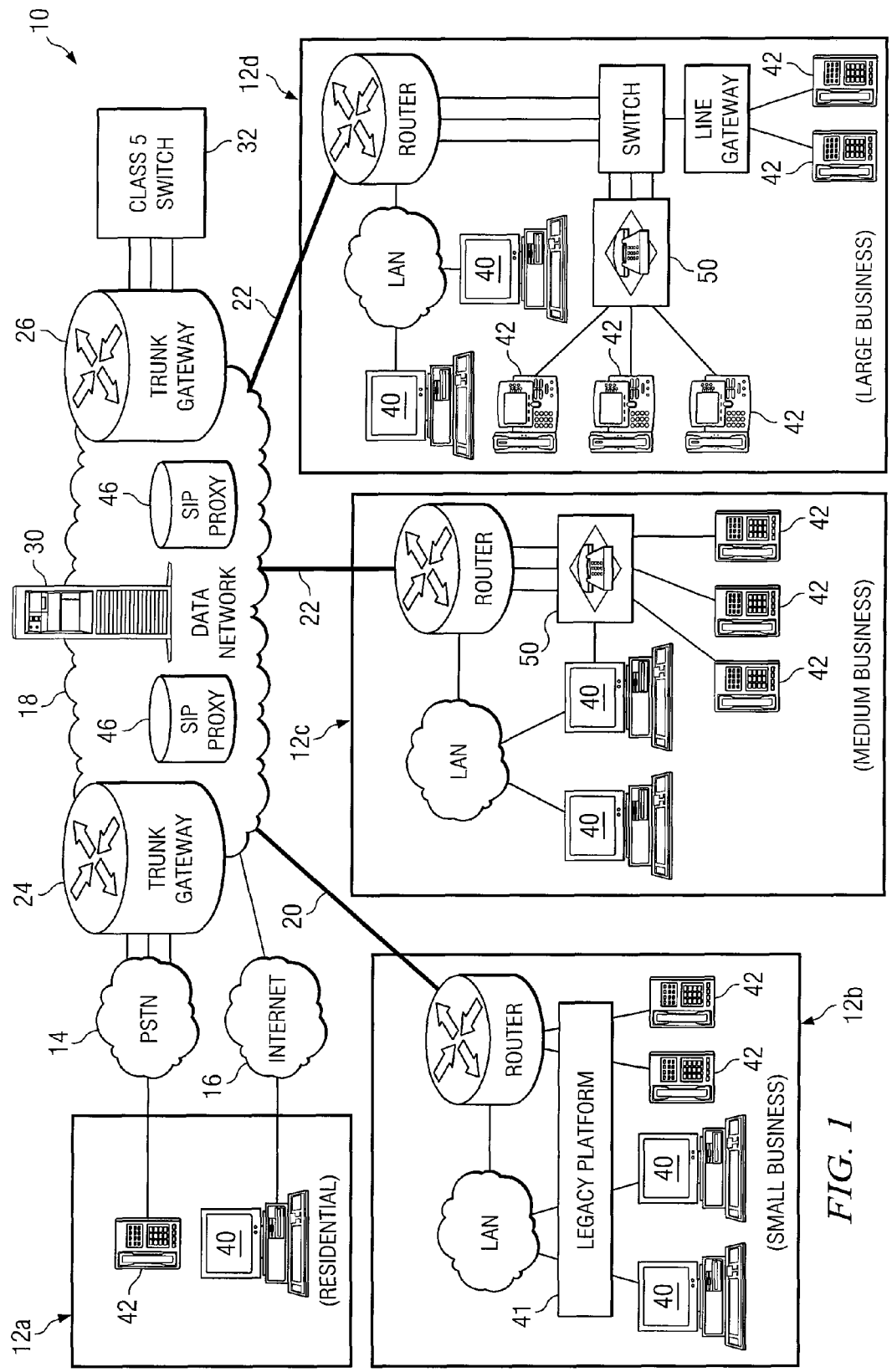
FIG. 1 is a simplified block diagram of an exemplary communication system for exchanging data in accordance with certain teachings of the present invention.

FIG. 1 is a simplified block diagram of an exemplary communication system 10 for exchanging data in accordance with certain teachings of the present invention. Communication system 10 includes domains 12a-12d, a public switched telephone network (PSTN) 14, a wide-area network 16 (such as the Internet), a data network 18, a broadband access link 20, and a number of additional links 22. Additional links 22 may include, for example, a digital subscriber line (DSL) link, a T1 link, a fiber optic link, or a wireless link. Communication system 10 also includes a set of trunk gateways 24 and 26, a third-party application server 30, a Class-5 switch 32, and may include one or more proxies 46.

Each domain may include suitable network equipment and appropriate infrastructure (e.g., switches, routers, LANs, gateways, etc.) to facilitate a communication session. Domain 12a represents a residential location, which consists of a computer 40 and a telephone 42. Telephone 42 may be an Internet protocol (IP) telephone or a standard telephone operable to interface with computer 40 such that one or more IP telephony capabilities are enabled through telephone 42. Accordingly, two types of telephones are illustrated in FIG. 1. Domain 12b represents a small business entity, which consists of a local area network (LAN), a router, several computers 40, and several telephones 42. In addition, domain 12b may include a legacy platform 41, which is operable to communicate with each telephone 42 and/or computer 40.

Domain 12c represents a medium business entity, which consists of a LAN, router, a private branch exchange (PBX) or key system, several computers 40, and several telephones 42. Domain 12d is a large business entity, which consists of a LAN, a router, a switch, a line gateway, several computers 40, and several telephones 42. Note that domains 12c and 12d each include a communication platform 50, which is operable to communicate with any number of "endpoints" (e.g., telephones 42 and/or computer 40). Communication platform 50 may be any suitable unit operable to interface with endpoints (e.g., telephone 42, computer 40, etc.).

Note that the term "endpoint" encompasses a myriad of potential devices and infrastructure that may benefit from the operations of communication system 10. Endpoints may represent a personal digital assistant (PDA), a cellular telephone, a standard telephone (which may be coupled to a personal computer), an IP telephone, a personal computer, a laptop computer, a mobile telephone, or any other suitable device or element (or any appropriate combination of these elements) that is operable to receive data or information. FIG. 1 illustrates only one set of example devices that may be used within communication system 10. The present invention is replete with numerous alternatives that could be used to facilitate the operations of communication system 10.

It should also be noted that the internal structure of elements within domains 12a-d are malleable and may be readily changed, modified, rearranged, or reconfigured in order to achieve intended operations. As noted above, software and/or hardware may reside in any element of domains 12a-d in order to implement the remote call control features of the present invention. Specifically, such items may be included in (or loaded into) any targeted communication platform (e.g., legacy platform 41 or communication platform 50) and/or endpoint (e.g. telephones 42 and/or computers 40). However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of the elements included within domains 12a-d in the context of communication system 10 and, accordingly, it should be construed as such.

In certain embodiments of the present invention, communication platform 50 is a back-to-back user agent (B2BUA) that may implement various IP telephony signaling protocols and functions. A B2BUA is an intermediary element that establishes sessions and facilitates dialogs between endpoints. But a B2BUA also receives requests from endpoints and determines how the requests should be answered. Thus, a B2BUA also may serve as an endpoint in a communication system. A B2BUA generally maintains dialog state and participates in all requests sent in dialogs that it has established, allowing it to provide some advanced calling features to endpoints. In a particular embodiment of the present invention, communication platform 50 is a B2BUA that is manufactured and marketed as "Call Manager" by Cisco Systems, Inc. of San Jose, Calif.

Also in certain embodiments of the present invention, communication platform 50 and various endpoints implement the Session Initiation Protocol (SIP), which is an open standard protocol. Thus, for purposes of teaching and discussion, it also is useful to provide some overview of an exemplary SIP environment in which certain features of the present invention may be implemented. The following foundational information may be viewed as a basis from which the present invention may be properly explained. Such information is offered earnestly for purposes of explanation only, and accordingly, should not be construed in any way to limit the broad scope of the present invention and its potential applications.

SIP is an application-layer control protocol that can establish, modify, and terminate multimedia sessions (conferences) over a switched-packet network. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

In general, SIP supports five facets of establishing and terminating multimedia communications: 1) user location (determining the end system to be used for communication); 2) user availability (determining the willingness of the called party to engage in communications); 3) user capabilities (determining the media and media parameters to be used); 4) session setup ("ringing" establishment of session parameters at both called and calling party locations); and 5) session management (including transfer and termination of sessions, modifying session parameters, and invoking services).

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. SIP can function with SOAP, HTTP, XML, SDP, and a variety of other protocols to implement services.

Endpoints in a SIP environment communicate by exchanging messages, which may be either a "request" or a "response." Generally, an endpoint (also sometimes referred to as a "user agent" or "UA") operates as either a User Agent Client (UAC) or a User Agent Server (UAS), although a single endpoint can (and often does) operate as both a UAC and a UAS. A UAC generates requests and sends them to one or more UASs. A UAS receives requests, processes them, and sends responses.

Proxy elements also play a significant role in many SIP environments. A SIP proxy (or SIP proxy server) is any intermediary element that may act as a UAC or a UAS, or both, for the purpose of exchanging messages on behalf of other user agents. Generally, the primary function of a SIP proxy server, such as SIP proxy 46 in FIG. 1, is to route messages between SIP endpoints.

When a UAC desires to initiate communication session, the UAC transmits an INVITE request. The INVITE request may be forwarded by one or more proxies or B2BUAs, eventually arriving at one or more UASs that may accept the INVITE. Before accepting or rejecting an INVITE, though, a UAS may send one or more provisional responses to advise the UAC of the INVITE progress.

A "dialog" is another significant concept in a SIP environment. A dialog generally represents a peer-to-peer SIP relationship between two UAs that persists for some time. The dialog facilitates sequencing of messages between the UAs, as well as proper request routing between them. Two endpoints may create a dialog through a variety of methods, but an INVITE is generally regarded as the most common method.

While SIP's open architecture provides significant flexibility and interoperability between devices, it has yet to evolve into an architecture that supports many advanced calling features. Certain features of the present invention address SIP's limited capacity for remotely controlling or invoking features, particularly device-level features.

One feature of the present invention is a schema that defines information that needs to be exchanged to implement remote operations. Using this schema, endpoints may invoke features on a B2BUA, such as an immediate divert, a conference call, a call back, privacy, a call select, and a park. Likewise, a B2BUA may use this schema to send status line updates to an endpoint, or to send tones for an endpoint to play out. Additionally, certain features of the present invention may use this schema to pass XSI XML between features, applications, and endpoints.

Remote call control ("remotecc") may be used by one endpoint to request that another endpoint perform some call control related operation. In the context of a communication system such as communication system 10 having a B2BUA, an endpoint can use remotecc to request some operation be performed by the B2BUA. For example, an endpoint can provide a list of dialogs and request that the B2BUA establish a conference call. Likewise, the B2BUA can request the endpoint perform some operation, such as a call back operation.

The remote call control features of the present invention leverage the concept of using the SIP REFER mechanism as a general request/response primitive and the "norefersub" tag in a Require header to suppress the implicit subscription that is normally established for REFER requests.

In accordance with certain teachings of the present invention, a SIP REFER message used to implement call control features generally should include a Content-Type header and a Refer-To header. The message also may include a Content-Id header. A Content-Type header having a certain value indicates to endpoints (including B2BUAs) that a remote call control request or response is associated with the REFER message. Without this value, the REFER message will be processed as a transfer request. A Refer-To header identifies a call control resource associated with the call control request. Typically, the Refer-To header identifies the resource using a standard Uniform Resource Identifier (URI). In one embodiment, the Refer-To header identifies a resource that is included with or attached to the REFER message. For example, a URI that specifies a "cid" protocol effectively indicates that the resource is located within the contents of the message and is identified by a matching Content-Id header.

The call control resource includes parameters that identify the type of call control operation that is associated with the call control request, as well as any parameters associated with the operation. In a preferred embodiment, the call control resource comprises extensible markup language (XML) elements that represent the parameters. Parameters associated with certain call control operations are described in greater detail below, along with their representative XML elements.

FIG. 2 is an example remotecc request sent from a B2BUA to an endpoint, in accordance with teachings of the present invention. This example remotecc request demonstrates a call control operation wherein the B2BUA sends an update of a shared line privacy status to an endpoint coupled to the shared line.

Remote call control requests may be issued either within or without the context of an existing dialog. In other words, they may initiate a subscription or transaction independently of any particular INVITE dialog. Many such requests, however, have an impact on an existing dialog (e.g. soft-key events, tones, etc.). But protocol stacks on either side of a transaction commonly make assumptions about a REFER message being a trigger for a transfer operation. Sending remotecc requests out-of-dialog reduces undesired or unexpected effects of these assumptions. Accordingly, in a preferred embodiment of the present invention, all remotecc requests are exchanged out-of-dialog. Any affected dialog Id may be specified within the body of the request.

Current SIP standards dictate that a successful REFER transaction must trigger an implicit subscription. Other proposed standards, though, provide a mechanism for eliminating the implicit subscription, thereby allowing a particular REFER to be transactional only. In one embodiment of the present invention, a B2BUA uses both transactional REFERs and subscription-based REFERs. The presence or absence of the "norefersub" tag in a Require header determines which is used. If the norefersub tag is present, the REFER is transactional. If it is absent, the REFER triggers an implicit subscription. If a norefersub tag is absent, the request should contain an Accept header that specifies support for the remote call control features of the present invention.

FIG. 3 is a chart of exemplary call control requests that may be sent from an endpoint to a B2BUA to implement certain operations of the present invention. FIG. 3 also indicates which requests use the norefersub tag (i.e. transactional only), and which requests do not (i.e. trigger a subscription). Each type of call control request in FIG. 3 is represented by an element of a schema, which is described in greater detail below. Note that if a B2BUA receives a remotecc request that does not include a norefersub tag but is listed as a transaction in FIG. 3, the B2BUA should accept and process the request but immediately terminate the subscription with an empty final NOTIFY message.

FIG. 4 is a chart of exemplary schema elements that represent parameters associated with a soft-key event message request. An endpoint may use a soft-key event message to send soft-key presses to a B2BUA to invoke soft-key features that do not have an associated standard SIP primitive. Example features that may use a soft-key event message include a conference call, a conference list, remove last conference participant, park, immediate divert, call back, quality reporting tool (QRT), and select. The select feature allows an endpoint (or a user acting through an endpoint) to lock a call on a shared line, preventing other endpoints or users from accessing the call.

FIG. 5 is a chart of exemplary schema elements that represent parameters associated with a line-key event message request. An endpoint may use a line-key event message to send line-key presses to a B2BUA to invoke line-key features that do not have an associated standard SIP primitive. Privacy is an example of a line-key feature that may use a line-key event message.

FIG. 6 is a chart of exemplary schema elements that represent parameters associated with a data pass-through request. An endpoint may use a data pass-through request to send XSI XML events to B2BUA features and other telephony applications. B2BUAs also may use a data-pass-through request to send data to features or telephony applications of an endpoint. Example features that may use a data pass-through request include a conference list, a call back, or a quality reporting tool.

FIG. 7 is a chart of exemplary call control requests that may be sent from a B2BUA to an endpoint to implement certain operations of the present invention. FIG. 7 also indicates which requests should be transactional only, and which should be subscription-based. Each type of call control request in FIG. 7 is represented by an element of a schema, which is described in greater detail below.

FIG. 8 is a chart of exemplary schema elements that represent parameters associated with a request to initiate a call. A B2BUA may use an initiate call request to implement a call back feature and other telephony applications.

FIG. 9 is a chart of exemplary schema elements that represent parameters associated with a hold-retrieve request (i.e. a request to resume a call previously placed on hold). Conference calling is an example of a feature that may be implemented through a hold-retrieve request.

FIG. 10 is a chart of exemplary schema elements that represent parameters associated with a privacy request. Here, a B2BUA may send a privacy request to an endpoint to provide a current shard line privacy setting to the endpoint. If an endpoint supports remotecc, a B2BUA will send the shared line privacy setting to the endpoint after the first line is successfully registered.

FIG. 11 is a chart of exemplary schema elements that represent parameters associated with a status line update request. A B2BUA may send a status line update request to an endpoint to signal the endpoint to display localized text on a screen. For example, a B2BUA may send a status line update to an endpoint to indicate that a call is parked. A B2BUA also may use a status line update request to send error codes or error messages that are more explicit or descriptive than standard SIP error codes. This aspect of the invention is particularly advantageous in a communication system such as communication system 10, since it requires no modifications of or updates to any endpoint to implement new error codes or messages.

FIG. 12 is a chart of exemplary schema elements that represent parameters associated with a play tone request. A play tone request may be used by a B2BUA or other telephony applications. It allows features and applications to trigger an endpoint to play a tone either to the user, into the network, or both. Example features that may include a play tone request include a conference call or a barge.

FIG. 13 is a chart of exemplary schema elements that represent parameters associated with a call-forward-all update request. A B2BUA may send a call-forward-all update request to an endpoint to send call-forward-all setting to the endpoint for a particular line. The request URI in the REFER message specifies the affected line.

FIG. 14 is a chart of exemplary schema elements that represent parameters associated with a request to dial a call. This type of request may be used by a telephony application. It allows such an application to dial digits required to complete a call.

FIG. 15 is a chart of exemplary schema elements that represent parameters associated with a dial DTMF request. This type of request may be used by a telephony application. It allows an application to dial DTMF digits when a call is ready to send digits. DTMF digits are played when the request is made to the endpoint.

FIG. 16 is a chart of exemplary schema elements that represent parameters associated with a request to disconnect an active call. This type of request also may be used by a telephony application.

FIG. 17 is a chart of exemplary schema elements that represent parameters associated with a request to answer a call. This type of request may be used by a telephony application to answer an incoming call.

FIG. 18 is a chart of exemplary schema elements that represent parameters associated with a request to setup a call transfer. This type of request may be used by a telephony application. It allows an application to initiate a transfer request by creating a consultation call.

FIG. 19 is a chart of exemplary schema elements that represent parameters associated with a request to complete a call transfer. This type of request may be used by a telephony application. It allows an application to complete a transfer on an endpoint.

FIG. 20 is a chart of exemplary schema elements that represent parameters associated with a request to setup a conference call. This type of request may be used by a telephony application. It allows an application to initiate a conference by creating a consultation call.

FIG. 21 is a chart of exemplary schema elements that represent parameters associated with a request to complete a conference call. This type of request may be used by a telephony application. It allows an application to complete a conference on an endpoint.

FIG. 22 is a chart of exemplary schema elements that represent parameters associated with a request to place a call on hold. This type of request may be used by a telephony application. It allows an application to trigger an endpoint to hold a active call.

FIG. 23 is a chart of exemplary schema elements that represent parameters associated with a request to stop a currently playing tone at a device. This type of request may be used by a telephony application. It allows an application to stop playing any tone.

FIG. 24 is a chart of exemplary schema elements that represent parameters associated with a request to select or unselect a call. This type of request may be used by a telephony application. It allows an application to trigger an endpoint to select or unselect any call associated with the endpoint. A check mark or other similar indicator may be displayed to indicate a call is selected, and may be removed when a call is unselected.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

For instance, remotecc data pass-through requests may be multi-part MIME messages to carry data for some features and telephony applications. In such an embodiment, data pass-through may be bi-directional, and a B2BUA may both send and receive such requests and responses. Additionally, XML is a preferred format for call control resources, but the scope of the present invention is not limited to just this form. A call control resource may comprise elements and formats other than just those of XML, which may be suitable to implement teachings of the present invention. Finally, the detailed description presented above uses certain example requests, features, and parameters to demonstrate the operations and advantages of certain aspects of the invention, but these examples are illustrative only. The scope of the invention is intended to encompass any number of features and operations associated with remote call control and remote device control operations.

What is claimed is:

1. A remote call control method comprising:
exchanging a session initiation protocol REFER message associated with a call control request requesting a call control operation;
determining the absence of a norefersub tag from a header of the REFER message;
triggering a subscription in response to determining the absence of the norefersub tag from the header of the REFER message;
identifying a resource associated with the call control request, wherein the resource includes one or more parameters of the call control request that indicate a type of call control operation;
determining that, even though the norefersub tag is absent from the header of the REFER message, the call control operation is transactional-only, the determining based on the type of call control operation being performed;
terminating the subscription in response to determining that the call control operation is transactional-only while allowing the call control operation to be performed; and
performing the call control operation according to the parameters of the call control request.

2. The remote call control method of claim 1, wherein the resource comprises one or more extensible markup language elements representing the parameters.

3. The remote call control method of claim 1, wherein:
the resource comprises one or more extensible markup language elements representing the parameters, and
the resource is included in the REFER message.

4. The remote call control method of claim 1, wherein:
the resource comprises one or more extensible markup language elements representing the parameters, and
the call control request is selected from a group consisting of:
a soft-key event message;
a line-key event message; and
a data pass-through request.

5. The remote call control method of claim 4, wherein the soft-key event message is selected from a group of requests consisting of:
a conference request;
a park request;
a conference list request;
a remove last conference participant request;
an instant divert request;
a call back request;
a quality reporting tool request;
a select request; and
an unselect request.

6. The remote call control method of claim 1, wherein the call control request is a line-key event message comprising a privacy request.

7. The remote call control method of claim 1, wherein:
the resource comprises one or more extensible markup language elements representing the parameters, and
the call control request is a soft-key event message indicating a soft-key press for a select operation.

8. The remote call control method of claim 1, wherein:
the resource comprises one or more extensible markup language elements representing the parameters, and
the call control request is selected from a group consisting of:
an initiate call request;
a hold request;
a retrieve request;
a privacy request;
a status line update request;
a play tone request;
a call forward request;
a data pass-through request;
a dial call request;
a dial DTMF request;
an answer call request;
a transfer setup request;
a transfer complete request;
a conference setup request;
a hold request;
a stop tone request; and
a select request.

9. The remote call control method of claim 1, wherein:
the resource comprises one or more extensible markup language elements representing the parameters, and
the call control request is a status line update request comprising an error message.

10. A communication platform comprising a processor component, the processor component comprising hardware and operable to:

exchange a session initiation protocol REFER message with a remote endpoint, wherein the message is associated with a call control request requesting a call control operation;
determine the absence of a norefersub tag from a header of the REFER message;
trigger a subscription in response to determining the absence of the norefersub tag from the header of the REFER message;
identify a resource associated with the call control request, wherein the resource includes one or more parameters of the call control request that indicate a type of call control operation;
determine that, even though the norefersub tag is absent from the header of the REFER message, the call control operation is transactional-only based on the type of call control operation being performed;
terminate the subscription in response to determining that the call control operation is transactional-only while allowing the call control operation to be performed; and
execute the call control operation according to the parameters of the call control request.

11. The communication platform of claim 10, wherein the resource comprises one or more extensible markup language elements representing the parameters.

12. The communication platform of claim 10, wherein:
the resource comprises one or more extensible markup language elements representing the parameters, and
the resource is included in the REFER message.

13. The communication platform of claim 10, wherein:
the resource comprises one or more extensible markup language elements representing the parameters, and
the call control request is selected from a group consisting of:
  a soft-key event message;
  a line-key event message; and
  a data pass-through request.

14. The communication platform of claim 13, wherein the soft-key event message is selected from a group of requests consisting of:
  a conference request;
  a park request;
  a conference list request;
  a remove last conference participant request;
  an instant divert request;
  a call back request;
  a quality reporting tool request;
  a select request; and
  an unselect request.

15. The communication platform of claim 10, wherein the call control request is a line-key event message comprising a privacy request.

16. The communication platform of claim 10, wherein:
the resource comprises one or more extensible markup language elements representing the parameters, and
the call control request is a soft-key event message indicating a soft-key press for a select operation.

17. An endpoint comprising a processor element, the processor element comprising hardware and operable to:
exchange a session initiation protocol REFER message with a communication platform, wherein the message is associated with a call control request requesting a call control operation;
determine the absence of a norefersub tag from a header of the REFER message;
trigger a subscription in response to determining the absence of the norefersub tag from the header of the REFER message;
identify a resource associated with the call control request, wherein the resource includes one or more parameters of the call control request that indicate a type of call control operation;
determine that, even though the norefersub tag is absent from the header of the REFER message, the call control operation is transactional-only based on the type of call control operation being performed;
terminate the subscription in response to determining that the call control operation is transactional-only while allowing the call control operation to be performed; and
execute the call control operation according to the parameters of the call control request.

18. The endpoint of claim 17, wherein the resource comprises one or more extensible markup language elements representing the parameters.

19. The endpoint of claim 17, wherein:
the resource comprises one or more extensible markup language elements representing the parameters, and
the resource is included in the REFER message.

20. The endpoint of claim 17, wherein:
the resource comprises one or more extensible markup language elements representing the parameters, and
the call control request is selected from a group consisting of:
  an initiate call request;
  a hold request;
  a retrieve request;
  a privacy request;
  a status line update request;
  a play tone request;
  a call forward request;
  a data pass-through request;
  a dial call request;
  a dial DTMF request;
  an answer call request;
  a transfer setup request;
  a transfer complete request;
  a conference setup request;
  a hold request;
  a stop tone request; and
  a select request.

21. The endpoint of claim 17, wherein:
the resource comprises one or more extensible markup language elements representing the parameters, and
the call control request is a status line update request comprising an error message.

22. Software embodied in a non-transitory computer-readable medium comprising computer code such that when executed is operable to:
exchange a session initiation protocol REFER message with a remote endpoint, wherein the message is associated with a call control request requesting a call control operation;
determine the absence of a norefersub tag from a header of the REFER message;
trigger a subscription in response to determining the absence of the norefersub tag from the header of the REFER message;
identify a resource associated with the call control request, wherein the resource includes one or more parameters of the call control request that indicate a type of call control operation;

determine that, even though the norefersub tag is absent from the header of the REFER message, the call control operation is transactional-only based on the type of call control operation being performed;

terminate the subscription in response to determining that the call control operation is transactional-only while allowing the call control operation to be performed; and execute the call control operation according to the parameters of the call control request.

23. The software of claim 22, wherein the resource comprises one or more extensible markup language elements representing the parameters.

24. The software of claim 22, wherein:
the resource comprises one or more extensible markup language elements representing the parameters, and
the resource is included in the REFER message.

25. The software of claim 22, wherein:
the resource comprises one or more extensible markup language elements representing the parameters, and
the call control request is selected from a group consisting of:
a soft-key event message;
a line-key event message; and
a data pass-through request.

26. The software of claim 25, wherein the soft-key event message is selected from a group of requests consisting of:
a conference request;
a park request;
a conference list request;
a remove last conference participant request;
an instant divert request;
a call back request;
a quality reporting tool request;
a select request; and
an unselect request.

27. The software of claim 22, wherein the call control request is a line-key event message comprising a privacy request.

28. The software of claim 22, wherein:
the resource comprises one or more extensible markup language elements representing the parameters, and
the call control request is a soft-key event message indicating a soft-key press for a select operation.

29. The software of claim 22, wherein:
the resource comprises one or more extensible markup language elements representing the parameters, and
the call control request is selected from a group consisting of:
an initiate call request;
a hold request;
a retrieve request;
a privacy request;
a status line update request;
a play tone request;
a call forward request;
a data pass-through request;
a dial call request;
a dial DTMF request;
an answer call request;
a transfer setup request;
a transfer complete request;
a conference setup request;
a hold request;
a stop tone request; and
a select request.

30. The software of claim 22, wherein:
the resource comprises one or more extensible markup language elements representing the parameters, and
the call control request is a status line update request comprising an error message.

31. The remote call control method of claim 1, the determining whether the call control request is transactional only or subscription-based further comprising:
determining that the message includes a tag indicating that the call control request is transactional only; and
determining that the call control request is transactional only.

32. The remote call control method of claim 1, the determining whether the call control request is transactional only or subscription-based further comprising:
checking a list to determine whether the call control operation is associated with a transactional only request or a subscription-based request.

33. The remote call control method of claim 1, further comprising:
determining that the call control request is transactional only; and
terminating a subscription.

34. The endpoint of claim 17, the processor component operable to determine whether the call control request is transactional only or subscription-based by:
determining that the message includes a tag indicating that the call control request is transactional only; and
determining that the call control request is transactional only.

35. The endpoint of claim 17, the processor component operable to determine whether the call control request is transactional only or subscription-based by:
checking a list to determine whether the call control operation is associated with a transactional only request or a subscription-based request.

36. The endpoint of claim 17, the processor component operable to:
determine that the call control request is transactional only; and
terminate a subscription.

* * * * *